United States Patent
Malisz et al.

(10) Patent No.: US 6,719,906 B1
(45) Date of Patent: Apr. 13, 2004

(54) PROCESS FOR THE PREPARATION OF SOLUTIONS OF ANIONIC ORGANIC COMPOUNDS

(75) Inventors: Jacek Malisz, Grenzach-Wyhlen (DE); Adolf Käser, Bottmingen (CH); Rainer Kaufel, Hartheim (DE); Holger Lautenbach, Grenzach-Wyhlen (DE); Elke Polley, Rheinfelden (DE); Martina Hoffmann, Hausen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/111,948

(22) PCT Filed: Oct. 23, 2000

(86) PCT No.: PCT/EP00/10415

§ 371 (c)(1),
(2), (4) Date: Apr. 26, 2002

(87) PCT Pub. No.: WO01/32786

PCT Pub. Date: May 10, 2001

(30) Foreign Application Priority Data

Oct. 29, 1999 (EP) ............................................. 99121548

(51) Int. Cl.$^7$ .......................... B01D 61/16; C09B 67/46
(52) U.S. Cl. ....................... 210/639; 210/651; 210/710; 8/527; 8/636; 8/648; 162/72; 162/76
(58) Field of Search ................................. 210/702, 710, 210/724, 634, 638, 639, 644, 650, 651; 8/636, 648, 680, 436, 524, 527; 162/70, 72, 76

(56) References Cited

U.S. PATENT DOCUMENTS

| | | | |
|---|---|---|---|
| 4,402,701 A | 9/1983 | Gleinig et al. | 8/436 |
| 4,523,924 A | 6/1985 | Lacroix | 8/527 |
| 4,689,048 A | 8/1987 | Förtsch et al. | 8/524 |
| 4,778,603 A | 10/1988 | Koll et al. | 210/650 |
| 4,838,895 A * | 6/1989 | Galli et al. | 8/527 |
| 4,851,011 A * | 7/1989 | Lacroix et al. | 8/527 |
| 5,565,102 A | 10/1996 | Brandt et al. | 210/500.28 |
| 6,120,561 A | 9/2000 | Wild et al. | 8/527 |
| 6,241,786 B1 * | 6/2001 | Zarges et al. | 8/527 |

FOREIGN PATENT DOCUMENTS

| | | |
|---|---|---|
| DE | 3301870 | 7/1984 |
| EP | 0049802 | 4/1982 |
| EP | 0114031 | 7/1984 |
| EP | 0197006 | 10/1986 |
| EP | 0278320 | 8/1988 |
| EP | 0505870 | 9/1992 |
| EP | 0652044 | 5/1995 |
| EP | 0802240 | 10/1997 |

OTHER PUBLICATIONS

English Abstract for EP 0505870 (9/92).
English Abstract for DE 3301870 (7/84).

* cited by examiner

*Primary Examiner*—Joseph Drodge
(74) *Attorney, Agent, or Firm*—Kevin T. Mansfield

(57) ABSTRACT

A process for the preparation of concentrated solutions or suspensions of anionic organic compounds is described, which process comprises a) acidifying an aqueous solution or dispersion of an anionic organic compound that comprises salts and/or impurities to a pH of 4.5 or less, if the pH is above that value, so that the anionic organic compound becomes insoluble in water and precipitates out in the form of the free acid, b) bringing the suspension obtained from the previous step to a salt content below 2% by weight, based on the total weight of retentate, by means of ultra-filtration with a ceramic membrane or an acid-resistant organic membrane having a pore size of from 1 to 20 nm, and c) optionally washing out of the salts with water at a pH of less than 4.5, d) optionally carrying out acid-free washing with water thereafter, and then e) concentrating so that the content of anionic organic compound is from 5 to 50 % by weight, and f) optionally bringing the anionic organic compound into solution by adding a suitable base.

22 Claims, No Drawings

PROCESS FOR THE PREPARATION OF SOLUTIONS OF ANIONIC ORGANIC COMPOUNDS

This application is a 371 of PCT/EP00/10415, filed Oct. 23, 2000 and claims the benefit of application EPO99121548.1, filed Oct. 29, 1999.

The present invention relates to a process for the preparation of solutions of anionic organic compounds, to the solutions so prepared and to the use of such solutions. In this context, anionic organic compounds are understood to be, especially, dyes and fluorescent whitening agents and also intermediates for the preparation thereof.

In recent years, the use of concentrated aqueous solutions, for example of dyes and fluorescent whitening agents, has gained in importance, that being the case because of the advantages that such solutions have over the corresponding powder forms. The use of solutions avoids the difficulties associated with dust formation and frees the users from the time-consuming, and often difficult, task of dissolving the powder in water. The use of concentrated solutions has also been encouraged by the development of continuous processes for dyeing or whitening paper because it is advantageous in those processes for the solution to be introduced directly Into the hollander or added at some other suitable point in paper manufacture.

In the case of a number of dyes and fluorescent whitening agents, however, formulating concentrated solutions presents difficulties because the concentrated solutions, especially when they still comprise significant amounts of inorganic salts, tend to gel. It is then not practically possible for such gels to be purified and/or desalted by filtering off and washing.

Furthermore, on storage, especially at temperatures below room temperature, there are often formed in the concentrated solutions deposits which either cannot be redissolved at all or can be redissolved only by carrying out additional work. Moreover, if concentrated anionic dye or fluorescent whitening agent solutions are to be suitable as commercial forms, they should, on being diluted to produce the dyebaths, yield clear solutions containing about from 1 to 3% by weight of dye or fluorescent whitening agent without a precipitate, and that should also be the case over a pH range that is as wide as possible.

The present Invention Is based on the problem of providing suitable concentrated solutions of such dyes and fluorescent whitening agents and also intermediates for the preparation thereof in which the mentioned difficulties do not occur.

It has now been found that, by means of the process described hereinbelow, it is possible to prepare, simply and economically, concentrated solutions that excellently meet the demands made. The process represents a simple and economical method for converting anionic organic compounds present in a poorly soluble salt form into a readily soluble form by temporarily converting particular or all acid groups Into the acid form and subsequently neutralising them using suitable bases.

The present invention accordingly relates to a process for the preparation of concentrated solutions or suspensions of anionic organic compounds, which process comprises a) acidifying an aqueous solution or dispersion of an anionic organic compound that comprises salts and/or impurities, to a pH of 4.5 or less, if the pH is above that value, so that b) the anionic organic compound becomes insoluble in water and precipitates out in the form of the free acid, c) bringing the suspension, by means of micro- or ultra-filtration, to a salt content of less than 2% by weight, based on the total weight of the retained material, with d) optional washing out of the salts with water at a pH of less than 4.5, e) then optionally washing with water until acid-free, then f) increasing the concentration so that the content of anionic organic compound is from 5 to 50% by weight, and g) optionally dissolving the anionic organic compound by addition of a suitable base.

Anionic organic compounds are to be understood as being especially dyes and fluorescent whitening agents and intermediates for the preparation thereof.

Suitable dyes for the process according to the invention are anionic dyes that are stable and insoluble in water at pH values of less than 4.5. Such dyes may belong to any desired class. They are, for example, dyes containing at least one sulfonic acid group and/or carboxylic acid group from the following classes of dyes: metal-free or metal-containing mono-, bis- and poly-azo dyes, pyrazolone, thioxanthone, oxazine, stilbene, formazan, anthraquinone, nitro. methine, triphenylmethane, xanthone, naphthazarine, styryl, azastyryl, naphthoperinone, quinophthalone and phthalocyanine dyes. Such dyes may contain one or more fibre-reactive groups in the molecule.

Preference is given to azo dyes containing at least one sulfo group and, amongst those, especially the so-called azo direct dyes, for example those referred to in The Colour Index, Third Edition, Volume 2 (The Society of Dyers and Colourists, 1971). A further preferred dass is that of the so-called stilbene dyes.

Special preference Is given to dyes that are suitable for the dyeing of paper and, amongst those, especially the dyes of formula

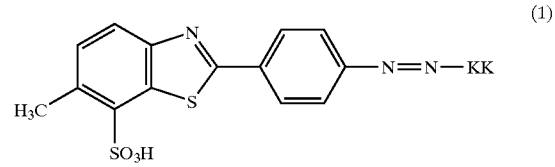

wherein KK is the radical of a coupling component.

KK is preferably a coupling component of formula

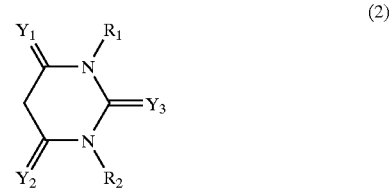

wherein
$Y_1$ and $Y_2$ are each independently of the other =O, =NH or =N—$C_1$–$C_4$alkyl,
$Y_3$ is =O, =S, =NR or =N—CN, R being hydrogen or $C_1$–$C_4$alkyl, and
$R_1$ and $R_2$ are each independently of the other hydrogen, unsubstituted or substituted alkyl or unsubstituted or substituted phenyl.

In formula (2) above, only one tautomeric form is indicated for the coupling component, but the formula is intended also to encompass the other tautomeric forms.

When $R_1$ and/or $R_2$ is/are an unsubstituted or substituted alkyl group, it is to be understood as being, for example, methyl, ethyl, n- or iso-propyl, n-, sec- or tert-butyl, straight-chain or branched pentyl or hexyl or cyclohexyl; the said radicals may be mono- or poly-substituted, for example by OH, $C_1$–$C_4$alkoxy or by $C_1$–$C_4$hydroxyalkoxy.

Examples of suitable substituted alkyl radicals are: methoxymethyl, ethoxymethyl, ethoxy-ethyl, ethoxypropyl, n-propoxymethyl, butoxyethyl and 2-hydroxyethoxypentyl.

When $R_1$ or $R_2$ is unsubstituted or substituted phenyl, the lafter may be mono- or poly-substituted, for example by $C_1$–$C_4$alkyl, $C_1$–$C_4$alkoxy, halogen, e.g. fluorine, chlorine or bromine, or by nitro.

$R_1$ and $R_2$ are preferably hydrogen or $C_1$–$C_4$alkyl.

$Y_1$ and $Y_2$ are preferably =O or =NH; furthermore, $Y_1$ and $Y_2$ are preferably the same.

$Y_3$ is preferably =O, =S, =NH or =N—CN, especially =NH.

The dyes of formula (1) are known or can be synthesised in a manner known per se.

The stibene dyes are complex dye mixtures which result from the condensation of 4-nitro-toluene-2-sulfonic acid with itself or with other aromatic compounds. Their structure is defined by the mode of preparation. Suitable stilbene dyes are, for example, those described in The Colour Index, Third Edition, Volume 4 (The Society of Dyers and Colourists, 1971) under the constitution numbers from 40.000 to 40.510.

Suitable dyes for the process according to the invention are preferably Direct Yellow 11 and its derivatives Direct Yellow 6 and Direct Orange 15, which derivatives are obtainable by means of reductive sub-steps additionally incorporated into the synthesis.

Suitable fluorescent whitening agents for the process according to the invention are sulfo- and/or carboxy-group-containing whitening agents of various classes, for example bis(triazinylamino)stilbenes, bis(triazolyl)stilbenes, bis(styryl)biphenyls and bis(benzofuranyl)biphenyls, bis(benzoxalyl) derivatives, bis(benzimidazolyl) derivatives, coumarin derivatives and pyrazoline derivatives.

For example, the process according to the invention is suitable for the preparation of concetrgted solutions of the following fluorescent whitening agents:

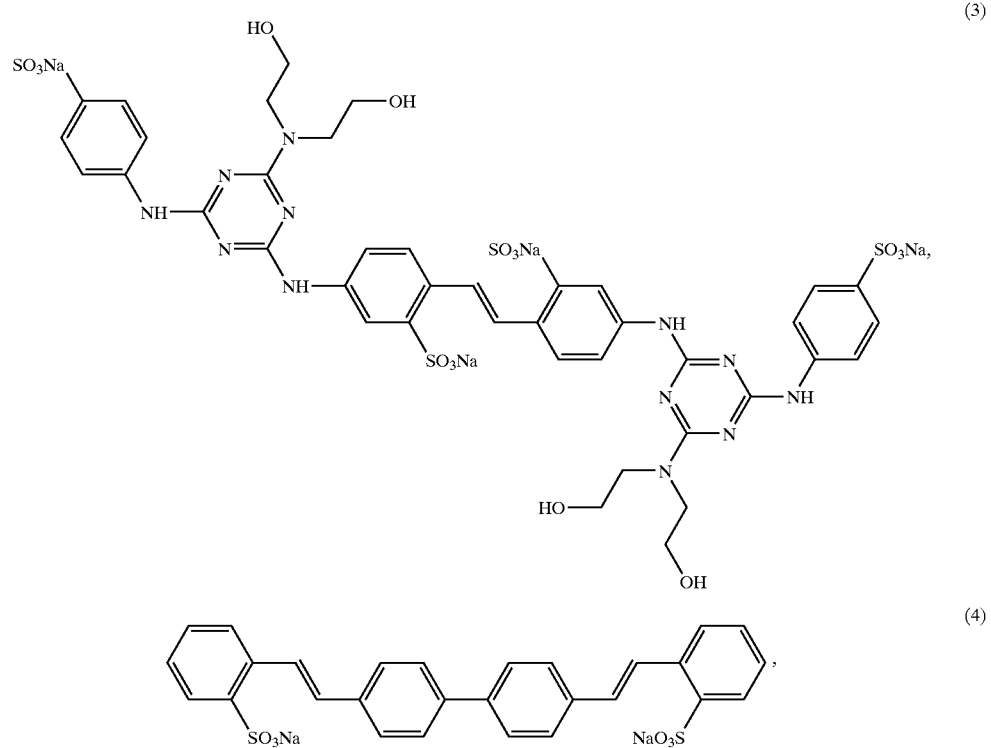

-continued
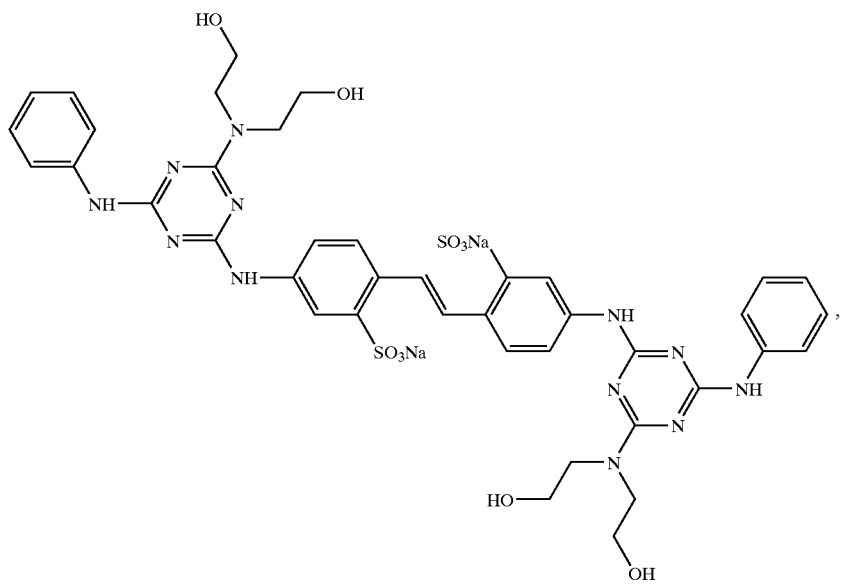
(5)
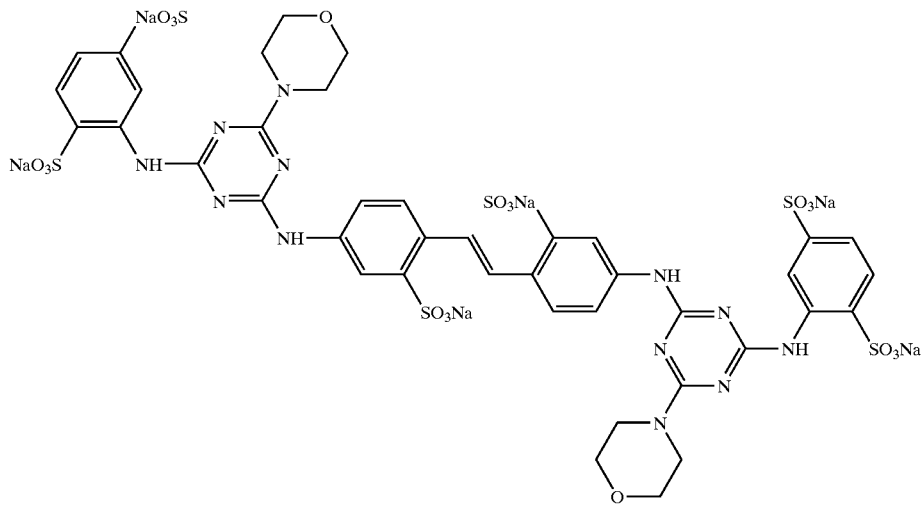
(6)
and
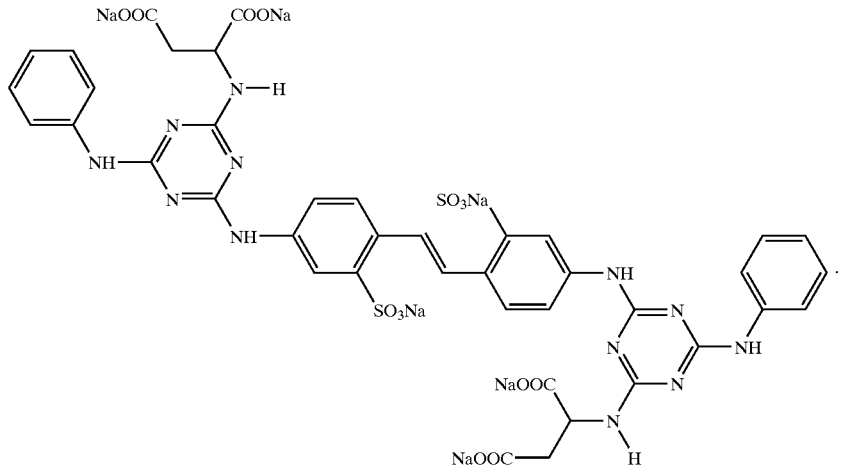
(7)
Suitable intermediates for the process according to the invention are especially anionic intermediates that are used for the synthesis of dyes or of fluorescent whitening agents.
They are, especially, aromatic sulfonic acids that also carry one or more further substituents, for example amino, nitro, alkyl or hydroxy.

Especially suitable intermediates are, for example, 2-amino-5-hydroxynaphthalene-7-sulfonic acid, 4-aminotoluene-2-sulfonic acid, dehydroparathiotoluidine-sulfonic acid, 4,4'-diamino-stilbene-2,2'-disulfonic acid, 4,4'-dinitrostilbene-2,2'-disulfonic acid, 4,4'-diamino-diphenyl-amine-2-sulfonic acid and 4-nitrotoluene-2-sulfonic acid.

The process according to the invention is carried out in particular as follows:

The process usually starts from an aqueous synthesis solution or suspension that, besides the anionic organic compound, also comprises greater or lesser amounts of starting materials, secondary products, salts or other impurities. If, however, the anionic organic compound is present in solid form or in the form of a slurry or paste, it is first dispersed in water so that an aqueous suspension or solution is obtained.

If the anionic organic compound is already present therein in the form of the free acid, the micro- or ultra-filtration is carried out directly thereafter, whereas if it is present in salt form, the first step of the process according to the invention is to convert the salt into the free acid.

In the case of compounds containing a plurality of sulfo groups it is sometimes advantageous to carry out the conversion into the free acid in a plurality of steps at different pH values and/or temperatures or to convert only particular sulfo groups into the free acid.

For preparation of the free acid, an aqueous solution or dispersion of the anionic organic compound, which comprises salts and/or other impurities, is acidified to a pH of 4.5 or less and is stirred or mixed until the anionic organic compound has been virtually completely converted into the free acid and is therefore insoluble in water and precipitates out That is carried out preferably by adding a strong inorganic acid, for example hydrochloric acid or sulfuric acid, until the desired pH has been obtained. The conversion is advantageously carried out at a temperature of from 15 to 140° C., especially from 20 to 95° C.

The optimum pH, the temperature, the concentration and the duration of mixing must be matched to the anionic organic compound and the desired degree of conversion. The optimum conditions can readily be determined by means of appropriate tests.

In the case of anionic organic compounds that are difficult to convert it can be useful first to subject the solution or suspension to partial desalting and only then to carry out conversion into the free acid. That can be done, for example, by means of nanofiltration or intermediate isolation of the anionic organic compound. In addition, special synthesis techniques for generating low-salt synthesis solutions can be used, for example simultaneous diazotisation and coupling. It is also possible to wash an anionic organic compound that has been only partially converted into the free acid, until it has a low salt content and then to add acid again and, optionally at elevated temperature, to carry out stirring or mixing.

Washing and conversion into the free acid can also be carried out in continuous succession by circulating the suspension through a micro- or ultra-filtration unit which is connected in series to a reactor for converting into the free add and, optionally, heating.

In the process according to the invention microfiltration is preferably carried out. However, ultrafiltration can also be used. Because of the relatively fine membranes, the latter is suitable especially for compounds having an amorphous structure. However, the performance is often worse.

Micro- or ultra-filtration is carried out by generally known methods that are customary per se using known membranes. The membranes may consist of acid-resistant organic or inorganic material. Ceramic membranes are especially suitable—in the case of microfiltration especially those having a pore size of from 20 to 1000 nm, more especially from 100 to 800 nm, and in the case of ultraflftration especially those having a pore size of from 1 to 20 nm.

The temperature during micro- or ultra-filtration is approximately at from room temperature to about 95° C. preferably from 50 to 85° C. The pressure is dependent, inter alia, on the nature of the membrane, but is usually from 1.5 to 10 bar, preferably from 3 to 6 bar.

Washing and increasing the concentration by means of micro- or ultra-filtration is carried out until the desired salt content and the desired concentration of anionic organic compound are obtained. Normally, a content of inorganic salts of less than 2% by weight, preferably less than 0.5% by weight, based on the total weight of the suspension, is sought.

The content of anionic organic compound after micro- or ultra-filtration is preferably from 5 to 50% by weight, especially from 10 to 40% by weight, based on the total weight of the suspension.

After micro- or ultra-filtration, any desired base can be added to the low-salt or salt-free suspension obtained, in order to obtain readily soluble salts of the anionic organic compounds with any desired cations. Suitable bases are, for example, LiOH, $NH_4OH$, or organic amines, e.g. a $C_4-C_{12}$ trialkylamine, $C_4-C_{12}$ dialkylamine, $C_2-C_{15}$ alkanolamine or polyglycol amine. Preference is given to the use of LiOH, $NH_4OH$ or an alkanolamine.

The solutions of dye or whitening agent obtained may be used directly in that form or optionally after dilution. They may also, however, in customary manner, be dried and used in the form of powders or granules.

In the following Examples, parts refer to parts by weight, unless otherwise indicated, and percentages relate to percent by weight The temperatures are given in degrees Celsius.

EXAMPLE 1

96 parts of dehydrothio-p-toluidinesulfonic add are dispersed in 600 parts of water at 60° and dissolved at pH 7.5 to 8 by adding 25 parts of 50% sodium hydroxide solution. After dissolution is complete, 46.3 parts of sodium nitrite solution (46 parts in 100 parts of water) are added. The resulting solution is added over the course of 20 minutes to 90 parts of 32% hydrochloric acid and a little ice, the temperature being maintained at from 15° to 20° by continuous addition of ice. Stirring is carried out for 30 minutes and about 1400 parts of a yellow suspension are obtained. Before coupling, any excess sodium nitrite is removed using sulfamic acid.

40.5 parts of barbituric acid are added to the resulting suspension and stirring is carried out for 15 minutes. Then about 46 parts of 50% sodium hydroxide solution are added over 3 hours so that a pH of 3.3 is maintained. When no more sodium hydroxide solution is taken up, the mixture is heated to 75° and, at that temperature, 69 parts of 32% hydrochloric acid are added over 5 minutes; stirring is then carried out for a further 2 hours at from 80° to 85°, the orange suspension, which contains the sodium salt of the dye, being converted into the yellow suspension of the free acid of formula (8).

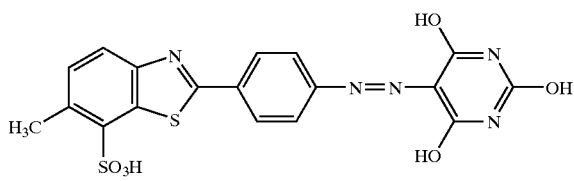

The volume is about 1800 parts.

The suspension is cooled to from 50° to 60° and the volume is reduced by one third by micro- or ultra-filtration in a conventional micro- or ultra-filtration system equipped with membrane cartridges (ceramic membrane on $Al_2O_3$ carrier material, pore size from 100 to 800 nm).

Then, In the same system, washing is carried out firstly with 3600 parts of deionised water that has been adjusted to a pH of 1.0 using HCl and then with 2400 parts of deionised water that has been adjusted to a pH of 4.5 using HCl. The concentration is then increased to 900 parts by volume.

A solution of 6.5 parts of lithium hydroxide . 1 $H_2O$ and 34 parts of triethanolamine in 80 parts of water is added to the resulting suspension. A clear dark solution having a pH of about 7 is obtained. After adding 80 parts of water, there are obtained 1100 parts of a storage-stable dye formulation having a sodium content of less than 300 ppm and a dye content of 11.6% (calculated as free acid).

If micro- or ultra-filtration is not used in the procedure and the dye is isolated from the suspension of the free acid by filtering off and washing the filter cake with water, it is not possible in industrial practice to obtain the desired low sodium content by means of conventional filter presses.

EXAMPLE 2

The procedure is as described in Example 1 but, instead of barbituric acid, an equivalent amount of cyanoiminobarbituric acid is used and the conversion into the free acid is carried out at 85° using 10% HCl. The concentration is then increased by a factor of 2 in the same microfiltration system. Washing is then carried out using 4 times the volume of deionised water adjusted to a pH of 3.0 using HCl.

After continuing to proceed as in Example 1, there is obtained, using triethanolamine alone as base, a storage-stable formulation of the dye of formula (9),

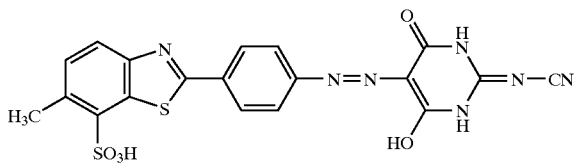

having a chloride content of less than 0.1% and a sodium content of less than 0.05%.

EXAMPLE 3

The procedure is as described in Example 1 but, instead of barbituric acid, an equivalent amount of 2,4,6-triaminopyrimidine is used and the conversion into the free acid is carried out at 60° and at a pH of from 1 to 2. The concentration is then increased by a factor of 2 in the same microliltration system. Washing is then carried out using 5 times the volume of deionised water adjusted to a pH of 1.0 using HCl.

After continuing to proceed as in Example 1, there is obtained a storage-stable formulation of the dye of formula (10),

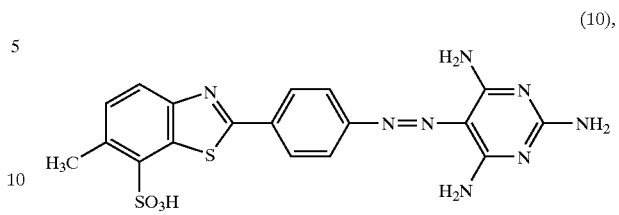

using as a mixture of bases an equivalent amount of a 1:1 mixture of 3-diethylamino-1-propylamine and diethanolamine.

EXAMPLE 4

800 parts of water are introduced into a flange flask and 120 parts of NaOH in solid form are so introduced therein that the temperature does not rise above 60°. 217 parts of 4-nitrotoluene-2-sulfonic acid are then added to the warm sodium hydroxide solution over the course of 5 minutes. The temperature is then increased to 74° over the couse of 1 hour and 100 parts of water are then added dropwise over the course of a further hour. The pH of the reaction mixture is greater than 12. Stirring is carried out for a further 4 hours at from 70 to 75°, then 650 parts of water are added and, over the course of 25 minutes, concentrated sulfunic acid is added until the dye has completely precipitated out. The reaction mixture is then stirred for a further 30 minutes in the hot state.

In analogous manner to that described in Example 1, there is obtained by means of microfiltration, by acid washing with dilute sulfuric acid, a low-salt dye form which, after increasing the concentration and neutralising using diethanolamine, yields a stable liquid formulation of the dye Direct Yellow 11.

EXAMPLE 5–49

The following Table contains further dyes that can, in accordance with the procedure according to Examples 1–3, be made into storage-stable concentrated solutions by micro- or ultra-filtration. The dye names relate to The Colour Index, Third Edition, Volume 2 (The Society of Dyers and Colourists, 1971).

| Example | Dye |
|---|---|
| 5 | Direct Yellow 27 |
| 6 | Direct Yellow 127 |
| 7 | Direct Yellow 132 |
| 8 | Direct Yellow 137 |
| 9 | Direct Orange 15 |
| 10 | Direct Yellow 142 |
| 11 | Direct Yellow 4 |
| 12 | Direct Yellow 148:1 |
| 13 | Direct Yellow 153 |
| 14 | Direct Yellow 157 |
| 15 | Direct Yellow 6 |
| 16 | Direct Yellow 169 |
| 17 | Direct Orange 26 |
| 18 | Direct Red 16 |
| 19 | Direct Red 23 |
| 20 | Direct Red 31 |
| 21 | Direct Red 238 |
| 22 | Direct Red 252 |

-continued

| Example | Dye |
|---|---|
| 23 | Direct Red 253 |
| 24 | Direct Red 254 |
| 25 | Direct Red 262 |
| 26 | Direct Violet 9 |
| 27 | Direct Violet 51 |
| 28 | Direct Violet 66 |
| 29 | Direct Violet 99 |
| 30 | Direct Yellow 51 |
| 31 | Direct Yellow 86 |
| 32 | Direct Yellow 154 |
| 33 | Direct Orange 118:1 |
| 34 | Direct Red 80 |
| 35 | Direct Red 239 |
| 36 | Direct Violet 35 |
| 37 | Direct Blue 67 |
| 38 | Direct Blue 75 |
| 39 | Direct Blue 78 |
| 40 | Direct Blue 80 |
| 41 | Direct Blue 218 |
| 42 | Direct Blue 267 |
| 43 | Direct Blue 273 |
| 44 | Direct Blue 281 |
| 45 | Direct Blue 290 |
| 46 | Direct Blue 301 |
| 47 | Direct Blue 86 |
| 48 | Direct Blue 199 |
| 49 | Direct Black 22 |
| 50 | Direct Black 168 |
| 51 | Direct Blue 86 |

What is claimed is:

1. A process for the preparation of concentrated solutions or suspensions of anionic organic compounds, which process comprises
   a) acidifying an aqueous solution or dispersion of an anionic organic compound that comprises salts and/or impurities, to a pH of 4.5 or less, if the pH is above that value, so that the anionic organic compound becomes insoluble in water and precipitates out in the form of the free acid,
   b) bringing the suspension obtained from the previous step to a salt content below 2% by weight, in retained material based on the total weight of retentate, by means of ultra-filtration with a ceramic membrane or an acid-resistant organic membrane having a pore size of from 1 to 20 nm, and
   c) optionally washing out of the salts with water at a pH of less than 4.5,
   d) optionally carrying out acid-free washing with water thereafter, and then
   e) concentrating so that the content of anionic organic compound is from 5 to 50% by weight, and
   f) optionally bringing the anionic organic compound into solution by adding a suitable base.

2. A process according to claim 1, wherein a dye, a fluorescent whitening agent or an intermediate for the preparation thereof is used as the anionic organic compound.

3. A process according to claim 2, wherein a dye containing at least one sulfonic acid group and/or carboxylic acid group from the following classes of dyes is used: metal-free or metal-containing mono-, bis- and poly-azo dyes, pyrazolone, thioxanthone, oxazine, stilbene, formazan, anthraquinone, nitro, methine, triphenylmethane, xanthone, naphthazarine, styryl, azastyryl, naphthoperinone, quinophthalone and phthalocyanine dyes.

4. A process according to claim 3, wherein an azo direct dye containing at least one sulfo group is used.

5. A process according to claim 4, wherein a dye of formula

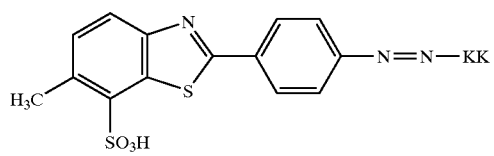

(1), wherein KK is the radical of a coupling component, is used.

6. A process according to claim 5, wherein a dye of formula (1), wherein KK is a coupling component of formula

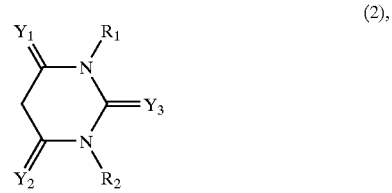

(2), wherein $Y_1$ and $Y_2$ are each independently of the other =O, =NH or =N—$C_1$-$C_4$alkyl, $Y_3$ is =O, =S, =NR or =N—CN, R being hydrogen or $C_1$-$C_4$alkyl, and $R_1$ and $R_2$ are each independently of the other hydrogen, unsubstituted or substituted alkyl or unsubstituted or substituted phenyl, is used.

7. A process according to claim 6, wherein a dye of formula (1), wherein KK is a coupling component of formula (2), wherein $R_1$ and $R_2$ are hydrogen or $C_1$-$C_4$alkyl, $Y_1$ and $Y_2$ are =O or =NH and $Y_3$ is =O, =S, =NH or =N—CN, is used.

8. A process according to claim 2, wherein a sulfo- and/or carboxy-group-containing fluorescent whitening agent from one of the following classes is used: bis(triazinylamino) stilbenes, bis(triazolyl)stilbenes, bis(styryl)biphenyls and bis(benzofuranyl)biphenyls, bis(benzoxalyl) derivatives, bis(benzimidazolyl) derivatives, coumarin derivatives and pyrazoline derivatives.

9. A process according to claim 8, wherein the fluorescent whitening agent

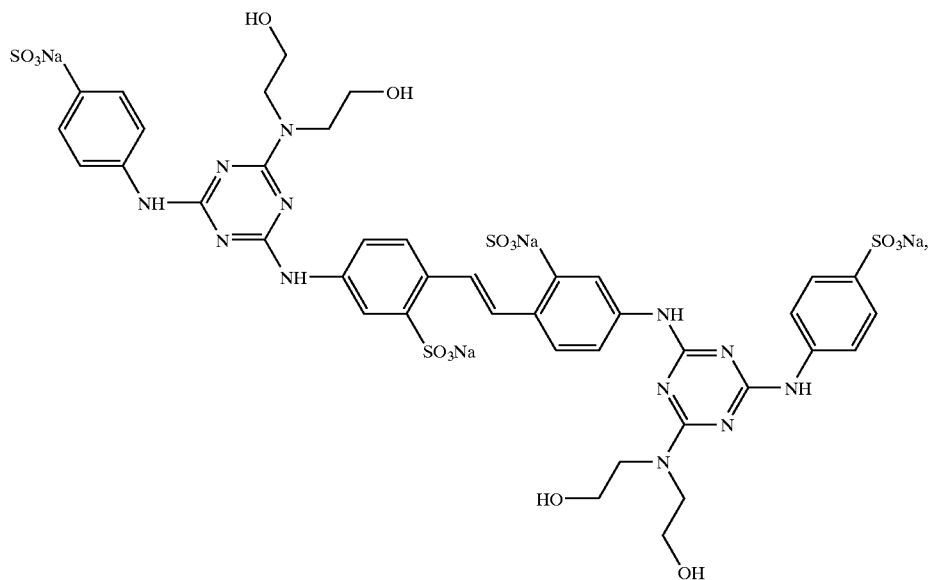
(3)
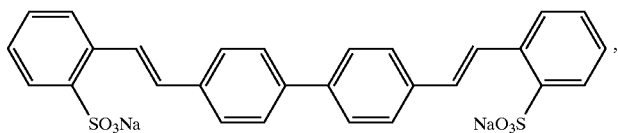
(4)
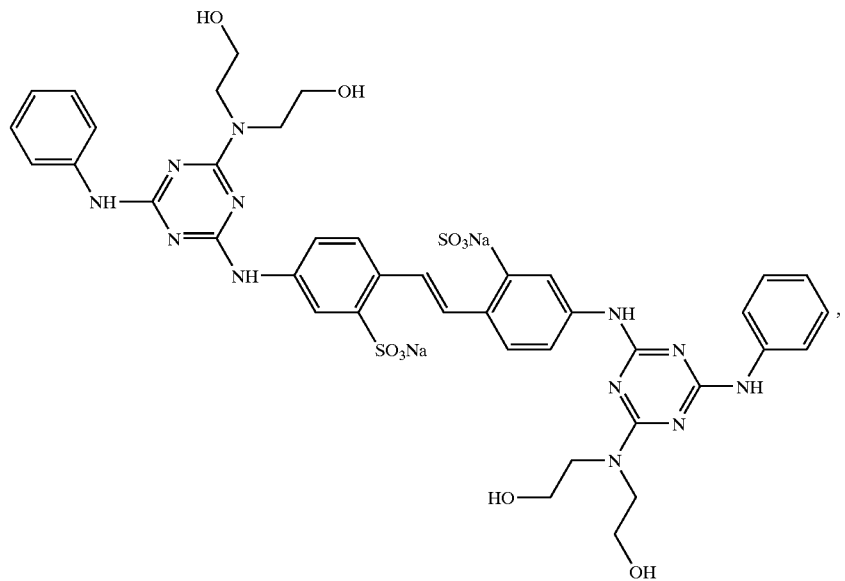
(5)

-continued

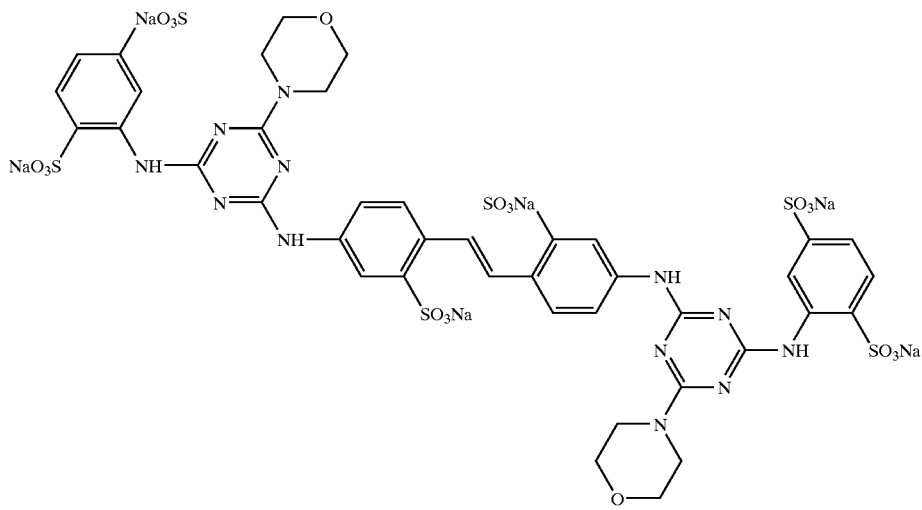

(6)

or

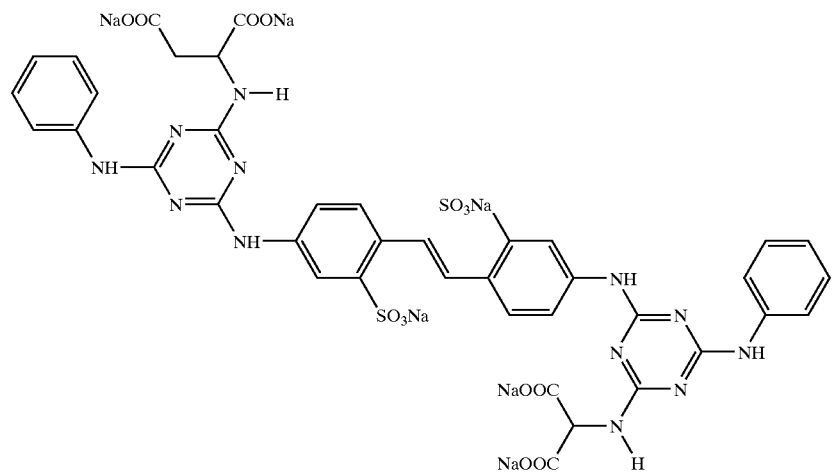

(7)

is used.

10. A process according to claim 2, wherein an aromatic sulfonic acid that also carries one or more further substituents selected from the group consisting of amino, nitro, alkyl and hydroxy is used as the anionic intermediate.

11. A process according to claim 10, wherein 2-amino-5-hydroxynaphthalene-7-sulfonic acid, 4-aminotoluene-2-sulfonic acid, dehydroparathiotoluidinesulfonic acid, 4,4'-diaminostilbene-2,2'-disulfonic acid, 4,4'-dinitrostilbene-2,2'-disulfonic acid, 4,4'-diamino-diphenylamine-2-sulfonic acid or 4-nitrotoluene-2-sulfonic acid is used.

12. A process according to claim 1, wherein the dye Direct Yellow 11, Direct Yellow 6 or Direct Orange 15 is used.

13. A process according to claim 1, which comprises starting from an aqueous synthesis solution or suspension that, besides the anionic organic compound, also comprises greater or lesser amounts of starting materials, secondary products, salts or other impurities.

14. A process according to claim 13, wherein particular or all sulfo or carboxy groups in the salt of the anionic organic compound in the synthesis solution or suspension are first converted into the free acid.

15. A process according to claim 1, wherein the ultra-filtration is carried out at from room temperature to about 95° C.

16. A process according to claim 1, wherein the ultra-filtration is carried out at a pressure of from 1.5 to 10 bar.

17. A process according to claim 1, wherein the ultra-filtration is so carried out that a content of inorganic salts of less than 0.5% by weight, based on the total weight of the suspension, is obtained.

18. A process according to claim 1, wherein the ultra-filtration is so carried out that a content of anionic organic compound of from 10 to 40% by weight, based on the total weight of the suspension, is obtained.

19. A process according to claim 1, wherein, after the ultra-filtration, LiOH, NH$_4$OH or an organic amine is added to the low-salt or salt-free suspension obtained.

20. A process according to claim 19, wherein a $C_4$–$C_{12}$trialkylamine, $C_4$–$C_{12}$dialkylamine, $C_2$–$C_{15}$alkanolamine or polyglycol amine is used as the organic amine.

21. A solution, obtained by the process according to claim 1, of an anionic organic compound.

22. A method for dyeing or whitening paper or for the synthesis of an anionic organic compound wherein a solution according to claim 21 is employed in at least one step.

* * * * *